United States Patent
Maiden et al.

[15] 3,699,811
[45] Oct. 24, 1972

[54] FLOW VELOCITY AND DIRECTION INSTRUMENT

[72] Inventors: Donald L. Maiden, Williamsburg; James H. Monteith, Newport News; Thomas D. Carpini, Hampton, all of Va.

[73] Assignee: The United States of America as represented by the Administrator of the National Aeronautics and Space Administration

[22] Filed: July 27, 1971

[21] Appl. No.: 166,541

[52] U.S. Cl. .................. 73/189, 73/147, 73/182, 73/212
[51] Int. Cl. .............................................. G01m 9/00
[58] Field of Search ......... 73/147, 182, 212, 180, 189

[56] References Cited

UNITED STATES PATENTS 3,329,016  7/1967  Leavens et al. ............... 73/182
3,474,669  10/1969  Carter et al. .................. 73/189

*Primary Examiner*—Donald O. Woodiel
*Attorney*—Howard J. Osborn et al.

[57] ABSTRACT

An instrument for providing measurements of both the magnitude and direction of flow velocities in a flow field. A probe is oriented in the flow field by two servo systems which impart two angular motions to the probe to aline it with the direction of the flow. The two angular motions are indicative of the direction of flow and the magnitude of the flow velocity is then measured by conventional means.

7 Claims, 3 Drawing Figures

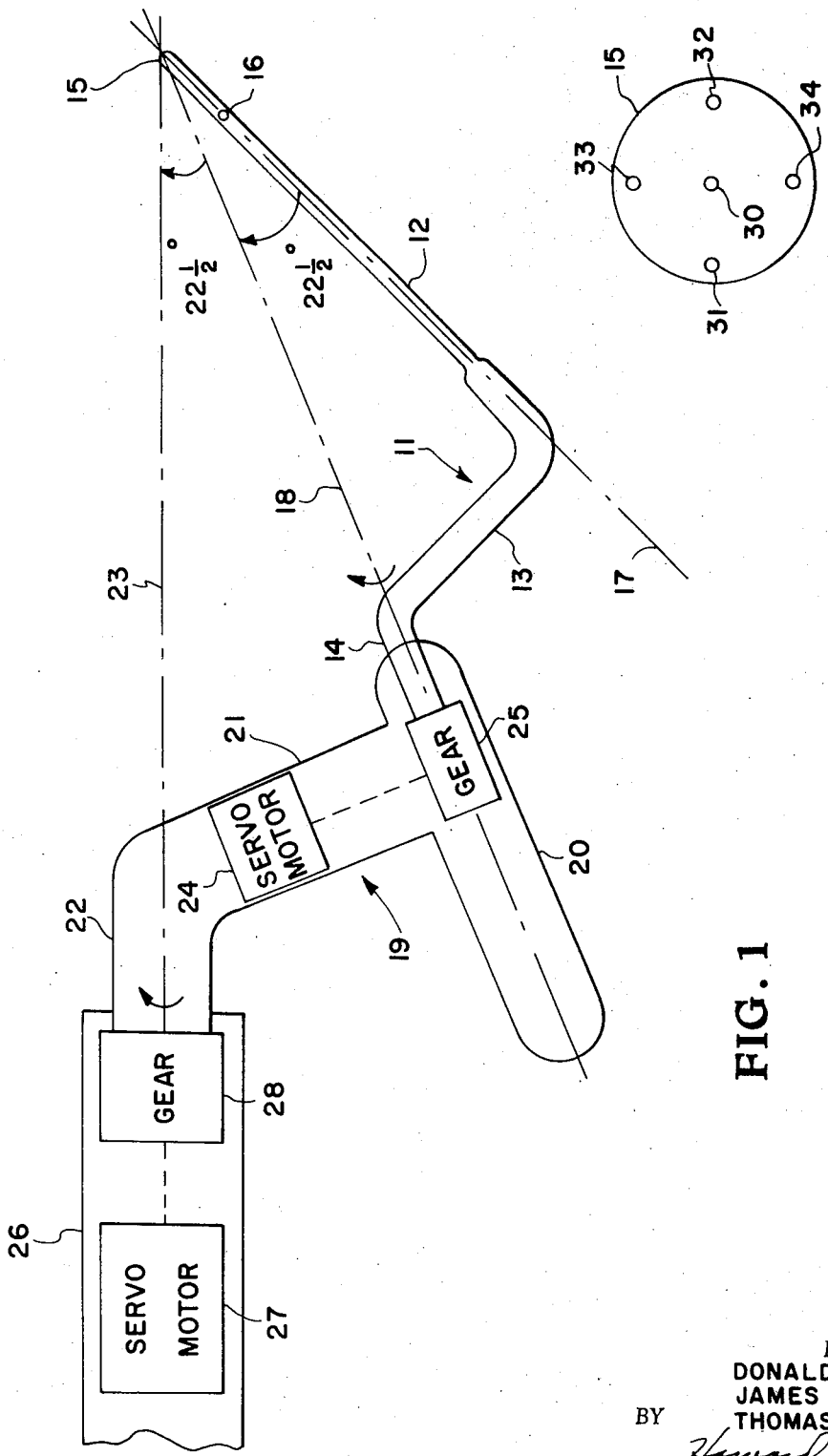

INVENTORS
DONALD L. MAIDEN
JAMES H. MONTEITH
THOMAS D. CARPINI
ATTORNEYS

FLOW VELOCITY AND DIRECTION INSTRUMENT

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates generally to flow velocity measurements and more specifically concerns a device for measuring both the magnitude and direction of flow velocities in a flow field.

In wind tunnel research, it has become more and more necessary to study the three-dimensional flow characteristics around the model. The magnitude and angular orientation of the airflow are of particular interest to the researchers. Various techniques and probe types have been designed to obtain this information. In small tunnels fixed probes are often used. The disadvantages of these fixed probes are that they have limited angular ranges and must have special calibrations which may always be questioned. In larger tunnels or on aircraft automatic null seeking probes can be used. This type of probe seeks out the direction of the wind velocity vector, and then by standard pitot techniques, determines its magnitude. In the past, automatic direction seeking probes were too large and did not provide the proper spatial resolution. Also, in many cases, they disturb the flow characteristics and they do not provide the necessary accuracy in their measurements.

It is therefore an object of this invention to provide an automatic null seeking probe that provides accurate measurements of both the direction and magnitude of a flow field.

Another object of this invention is to provide an automatic null seeking probe that disturbs the flow characteristics very little while interrogating a point in a flow field.

A further object of this invention is to provide an automatic null seeking probe that maintains a given point in space while searching for a null.

Other objects will become apparent hereinafter in the specification and drawings.

SUMMARY OF THE INVENTION

The null seeking probe which constitutes this invention has five pressure ports on its hemispherical face. The axial port is connected to one side of a differential pressure transducer, and the static ports on the body of the probe are connected to the other side of the transducer. This differential pressure is used to yield flow velocity data after the probe has found a null and is alined with the direction of flow. The other four ports consist of two sets of diagonal pairs. Each pair is connected to a differential pressure transducer which provides error signals for one of the two positioning servo mechanisms controlling one of the two angular motions of the probe. When the probe is in a nulled condition, the pressures of the ports are equal, and thus, the error signals are zero. In this condition the probe is alined with the direction of flow. The measurement of the pitot pressure yields the magnitude of the flow velocity, and the measurements of the two angular motions of the probe are indicative of the direction of the flow velocity.

BRIEF DESCRIPTION OF THE DRAWINGS

FIG. 1 is a schematic drawing showing the mechanical components of the invention;

FIG. 2 is a schematic drawing of the hemispherical face 15 of the probe in FIG. 1.

DETAILED DESCRIPTION OF THE INVENTION

Figure 3:
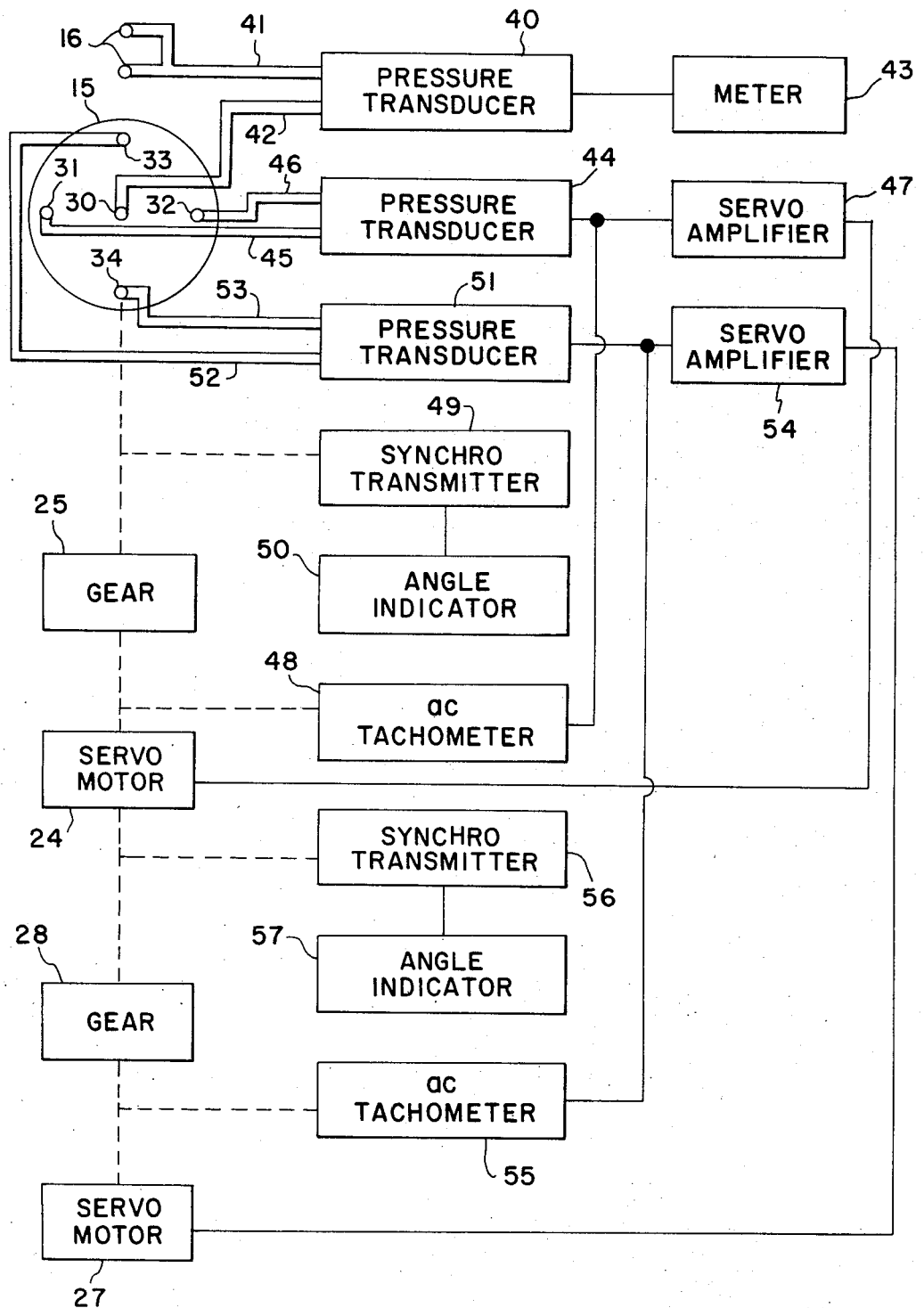
FIG. 3 is a block diagram of an embodiment of the invention.

Turning now to the embodiment of the invention selected for illustration in the drawings, FIG. 1 is a schematic drawing of the mechanical components of this invention. The sensing part 11 of the probe is a tube having three linear portions 12, 13 and 14. Located on the end of linear portion 12 is a hemispherical face 15 having five pressure ports which are disclosed in FIG. 2. Also located on the linear portion 12 are static pressure ports 16. An axis 17 through the linear portion 12 makes an angle of 22½° with an axis 18 through the linear portion 14. A housing 19 has three linear portions 20, 21 and 22. The linear portion 20 is alined with axis 18 and the linear portion 22 is alined with an axis 23 which makes an angle of 22½° with axis 18. Axes 17, 18 and 23 intersect at a point on the surface of face 15. A servo motor 24 is suitably attached to housing 19 and is mechanically connected through a gear 25 to the linear portion 14 of sensing part 11 to rotate sensing part 11 about axis 18. Axis 17 is the generatrix of a 22½° conical surface when revolved about axis 18. A housing 26 suitable for locating the hemispherical face 15 of the probe at any desired point in a flow field is alined with axis 23. A servo motor 27 is suitably attached to housing 26 and is mechanically connected to the linear portion 22 of housing 19 through a gear 28 to rotate housing 19 about axis 23. Axis 18 is the generatrix of a second 22½° conical surface when revolved about axis 23. With the condition that the vertex angles of the two generated cones are equal, then rotations about axis 18 and 23 allow the probe to assume any orientation within the confines of a third cone. This cone has a 45° angle. Thus, the cone can assume yaw and pitch angles up to plus or minus 45°, while the center of probe face 15 maintains a fixed point in space.

The hemispherical face 15 of the probe as shown in FIG. 2 includes a port 30 which is located on axis 17. Located on both sides of this port 30 are ports 31 and 32 which are in line with port 30. Also, located in line and on both sides of port 30 are ports 33 and 34. The line containing ports 33 and 34 is perpendicular to the line containing ports 31 and 32.

Sensing part 11 and housings 19 and 26 can be made from stainless steel tubing or any other suitable material that is available. Ports 16 and 30–34 are connected to pressure transducer (not shown in FIG. 1) by means of tubing (not shown) from the ports through sensing part 11 and housings 19 to 26 to the transducers. Also not shown in the drawing are electrical connections, and a.c. tachometers and synchro transmitters connected to the shafts of servo motors 24 and 27.

Referring now to FIG. 3, a differential pressure transducer 40 is connected to static ports 16 and axial port 30 on the hemispherical face 15 by means of tubes 41 and 42, respectively. The output of pressure transducer 40 is an electrical signal, representing the difference between the pressures at these ports, which is measured by a meter 43. The measurement made by meter 43 is the magnitude of the flow velocity. A pressure transducer 44 is connected to ports 31 and 32 by means of tubes 45 and 46, respectively. Transducer 44 produces an electrical signal which is proportional to the difference in the pressures at ports 31 and 32. This signal is applied through a servo amplifier 47 to servo motor 24 which acting through gear 25 changes the position of hemispherical face 15 such that the pressure at these two ports become equal. Servo motor 24 also drives an a.c. tachometer 48 to produce a damping signal that is applied to servo amplifier 47. A synchro transmitter 49 is connected to the shaft of servo motor 24 to produce a signal that is measured by an angle indicator 50 to give an indication of the position of the shaft of servo motor 24. Ports 33 and 34 are connected to a differential pressure transducer 51 by means of tubes 52 and 53, respectively. The difference electrical signal produced by transducer 51 is applied through servo amplifier 54 to servo motor 27 which drives housing 19 (FIG. 1) that has a servo motor 24 attached thereto. An a.c. tachometer 55 is connected to the shaft of servo motor 27 to produce a damping signal that is applied to servo amplifier 54. A synchro transmitter 56 is also attached to the shaft of motor 27 to provide a signal that is measured by an angle indicator 57 to give an indication of the shaft position of servo motor 27.

In the operation of the invention the hemispherical face 15 of the probe is placed at the desired point in a flow field by means of the housing 26. Then the difference in pressure at ports 31 and 32 causes an electrical error signal to be produced at the output of pressure transducer 44. This error signal is applied to the servo motor 24 which rotates sensing part 11 of the probe about axis 18 until the pressures at these two ports are equal. Simultaneously, the difference is pressures at ports 33 and 34 on the hemispherical face 15 of the probe causes pressure transducer 51 to produce a second electrical error signal. This second error signal is applied to the servo motor 27 which rotates housing 19 about axis 23 until the pressures at these two ports are equal. When both of the servo motors 24 and 27 have rotated to a null position, the flow in the flow field is parallel to axis 17. The velocity of this flow is proportional to the differential pressure at the axial port 30 and the static ports 16 which are connected to the transducer 40 by tubes 41 and 42. The resulting electrical signal is measured by meter 43 giving an indication of the magnitude of the flow velocity in the flow field. The readings on angle indicators 50 and 57 give the direction of flow of the flow field.

The advantages of this invention are that it provides an inexpensive, accurate instrument for measuring both the magnitude and direction of the flow velocity in a flow field. It provides a null seeking probe that maintains a selected point in the flow field while searching for a null and that disturbs the flow characteristics very little while interrogating the selected point.

It is to be understood that the form of the invention herewith shown and described is to be taken as a preferred embodiment. Various changes may be made in the shape, size and arrangement of parts. For example, equivalent elements may be substituted for those illustrated and described herein such as pressure transducers, angle indicators, a.c. tachometers and synchro transmitters and the angles between axes 17 and 18, and 18 and 23 may be any acute angle other than 22½° as long as the two angles are equal without departing from the spirit or scope of the invention as defined in the following claims.

What is claimed is:

1. An instrument for providing the measurements of the magnitude and the direction of a flow velocity at a fixed point comprising:
    first sensing means for producing a signal indicative of the magnitude of the flow velocity at said fixed point;
    second sensing means for producing signals indicative of the magnitude of the pressures at a first couple of point located on a first straight line with said fixed point;
    third sensing means for producing signals indicative of the magnitude of the pressures at a second couple of points located on a second line with said fixed point said second line being transverse to said first line;
    first servo means receiving the signals indicative of the magnitude of the pressures at said first couple of points for repositioning said second sensing means and said first couple of points such that the pressures at said first couple of points are equal;
    second servo means receiving the signals indicative of the magnitude of the pressures at said second couple of points for repositioning said third sensing means and said second couple of points such that the pressures at said second couple of points are equal;
    means for measuring said signal indicative of the magnitude of said flow velocity at said fixed point after said second and third sensing means have been repositioned whereby said measurement is indicative of the flow velocity at said fixed point; and
    means for measuring the positions of said first and second servo means whereby said measurements are indicative of the direction of the flow velocity at said fixed point.

2. An instrument according to claim 1 wherein said first, second and third sensing means includes a probe having five ports on its sensing end with a first port located at said fixed point, with a second and a third port located at said first couple of points and with a fourth and a fifth port located at said second couple of points.

3. An instrument according to claim 2 wherein said first sensing means further includes static ports and means for measuring the difference in pressure between said first port and said static ports.

4. An instrument according to claim 1 wherein said first, second and third sensing means includes a probe comprising:
    a first fixed section, a second section movable with respect to said first section about a first axis of rotation that passes through said fixed point; and a third section movable with respect to said second section about a second axis of rotation that passes through said fixed points and makes a first acute angle with said first axis of rotation said third section including an elongated portion along a third axis that passes through said fixed point and makes a second acute angle with said second axis of rotation that is equal to said first acute angle.

5. An instrument according to claim 4 wherein said elongated portion of said third section is terminated at said fixed point with a face having said five ports.

6. An instrument according to claim 4 wherein the motor included with said first servo means is fixed with respect to said second section and connected to said third section to rotate it about said second axis.

7. An instrument according to claim 6 wherein the motor included with said second servo means is fixed with respect to said first section and connected to said second section to rotate it about said first axis.

* * * * *